(12) United States Patent
Northrop et al.

(10) Patent No.: US 11,118,098 B2
(45) Date of Patent: Sep. 14, 2021

(54) SOLVENT MIXTURES FOR DISSOLVING ELEMENTAL SULFUR, METHODS OF UTILIZING THE SOLVENT MIXTURES, AND METHODS OF FORMING THE SOLVENT MIXTURES

(71) Applicants: P. Scott Northrop, The Woodlands, TX (US); Kevin A. Harnsberry, Livingston, TX (US)

(72) Inventors: P. Scott Northrop, The Woodlands, TX (US); Kevin A. Harnsberry, Livingston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 19 days.

(21) Appl. No.: 16/436,432

(22) Filed: Jun. 10, 2019

(65) Prior Publication Data
US 2020/0002599 A1 Jan. 2, 2020

Related U.S. Application Data

(60) Provisional application No. 62/690,576, filed on Jun. 27, 2018.

(51) Int. Cl.
*C09K 8/532* (2006.01)
(52) U.S. Cl.
CPC .................... *C09K 8/532* (2013.01)
(58) Field of Classification Search
None
See application file for complete search history.

(56) References Cited

U.S. PATENT DOCUMENTS

| | | | |
|---|---|---|---|
| 3,475,146 A | 10/1969 | Olund et al. | |
| 6,743,951 B2 | 6/2004 | Fremy | |
| 2011/0108464 A1* | 5/2011 | Rankin | C10G 21/00 208/220 |
| 2013/0167433 A1* | 7/2013 | Liu | C09K 8/532 44/622 |

OTHER PUBLICATIONS

Mao, J, et al. (2016) "Optimization of Effective Sulfur Solvents for Sour Gas Reservoir," Journal of Natural Gas Science and Engineering, vol. 36, pp. 463-471.

* cited by examiner

*Primary Examiner* — Jeffrey D Washville
(74) *Attorney, Agent, or Firm* — ExxonMobil Upstream Research Company—Law Department

(57) ABSTRACT

Solvent mixtures for dissolving elemental sulfur, methods of utilizing the solvent mixtures, and methods of forming the solvent mixtures. The solvent mixtures include an elemental sulfur solvent fraction and an odorant fraction. The elemental sulfur solvent fraction includes an elemental sulfur solvent that has a solvent odor and a solvent sulfur solubility of at least 10 weight percent (wt %). The odorant fraction includes at least one odorant that has an odorant odor that differs from the solvent odor. The solvent mixture includes at least 20 wt % and at most 80 wt % of both the elemental sulfur solvent fraction and the odorant fraction. The presence of the odorant fraction, within the solvent mixture, decreases an intensity of the mixture odor relative to the solvent odor and/or decreases an offensiveness of the mixture odor relative to the solvent odor.

20 Claims, 1 Drawing Sheet

SOLVENT MIXTURES FOR DISSOLVING ELEMENTAL SULFUR, METHODS OF UTILIZING THE SOLVENT MIXTURES, AND METHODS OF FORMING THE SOLVENT MIXTURES

CROSS REFERENCE TO RELATED APPLICATION

This application claims the priority benefit of U.S. Provisional Patent Application No. 62/690,576 filed Jun. 27, 2018, entitled SOLVENT MIXTURES FOR DISSOLVING ELEMENTAL SULFUR, METHODS OF UTILIZING THE SOLVENT MIXTURES, AND METHODS OF FORMING THE SOLVENT MIXTURES.

FIELD OF THE DISCLOSURE

The present disclosure relates generally to solvent mixtures for dissolving elemental sulfur, to methods of utilizing the solvent mixture, and to methods of forming the solvent mixtures.

BACKGROUND OF THE DISCLOSURE

In certain hydrocarbon production and/or processing facilities, elemental sulfur may deposit on various facility components. This elemental sulfur must be removed or it eventually will block fluid flow within the facility components.

Historically, diaryl disulfide (DADS)-based solvents have been utilized to dissolve elemental sulfur. Such DADS-based solvents are effective at removing elemental sulfur and do not exhibit an extremely unpleasant odor. However, DADS-based solvents have become difficult to obtain and/or utilize. Dimethyl Disulfide (DMDS)-based solvents also are effective at dissolving and/or removing elemental sulfur from hydrocarbon production and/or processing facility components. However, these solvents generally are extremely malodorous. Thus, it may be impractical, or impermissible, to apply DMDS-based solvents in many situations. Thus, there exists a need for improved solvent mixtures for dissolving elemental sulfur, for methods of utilizing the solvent mixtures, and/or for methods of forming the solvent mixtures.

SUMMARY OF THE DISCLOSURE

Solvent mixtures for dissolving elemental sulfur, methods of utilizing the solvent mixtures, and methods of forming the solvent mixtures are disclosed herein. The solvent mixtures include an elemental sulfur solvent fraction and an odorant fraction. The elemental sulfur solvent fraction includes an elemental sulfur solvent that has a solvent odor and a solvent sulfur solubility of at least 10 weight percent (wt %). The odorant fraction includes at least one odorant that has an odorant odor that differs from the solvent odor. The presence of the odorant fraction, within the solvent mixture, decreases an intensity of the mixture odor relative to the solvent odor and/or decreases an offensiveness of the mixture odor relative to the solvent odor.

DETAILED DESCRIPTION AND BEST MODE OF THE DISCLOSURE

Figure 1:
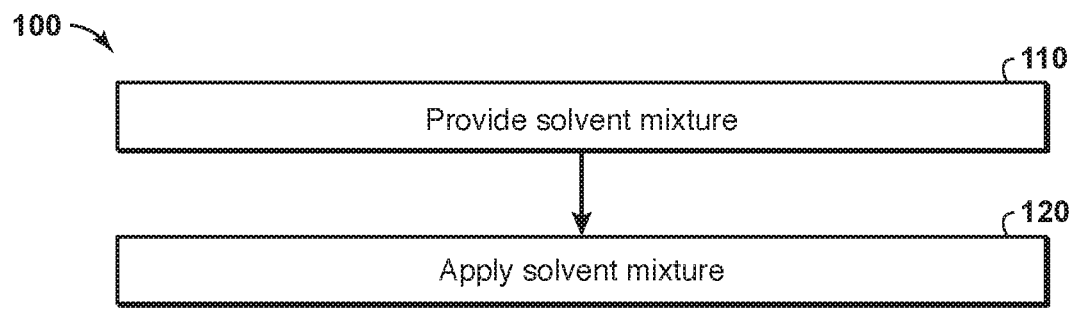
FIG. 1 is a flowchart depicting a method, according to the present disclosure, of removing elemental sulfur from a hydrocarbon conveyance system.

Solvent mixtures, according to the present disclosure, also may be referred to herein as reduced-odor solvent mixtures and/or as reduced-odor sulfur solvents and may be utilized to dissolve and/or to otherwise remove elemental sulfur. These solvent mixtures include, consist of, or consist essentially of an elemental sulfur solvent fraction and an odorant fraction. The elemental sulfur solvent fraction includes an elemental sulfur solvent having and/or exhibiting a solvent odor. The elemental sulfur solvent fraction also has and/or exhibits a solvent sulfur solubility, which also may be referred to herein as a solubility of elemental sulfur within the elemental sulfur solvent. The odorant fraction includes at least one odorant having an odorant odor that differs from the solvent odor of the elemental sulfur solvent. The mixture odor differs from the solvent odor and also may differ from the odorant odor.

The odorant fraction, or presence of the odorant fraction within the solvent mixture, may improve the mixture odor, or a mixture odor perceived by an individual who smells the solvent mixture, when compared to the solvent odor, or a solvent odor perceived by an individual who smells the elemental sulfur solvent. As an example, the presence of the odorant fraction may decrease an intensity, or a perceived intensity, of the mixture odor relative to the solvent odor. As another example, the presence of the odorant fraction may decrease an offensiveness, or a perceived offensiveness, of the mixture odor relative to the solvent odor. This decrease in intensity and/or offensiveness of the mixture odor, when compared to the solvent odor, may be accomplished via a variety of distinct and/or cooperative mechanisms.

As an example, the addition of the odorant to the elemental sulfur solvent may cause the solvent mixture to have a pleasant, or at least a more pleasant, mixture odor when compared to the solvent odor. Expressed in different terms, the addition of the odorant to the elemental sulfur solvent may cause the solvent mixture to have a less offensive and/or less malodorous mixture odor when compared to the solvent odor. As another example, the odorant fraction may be selected to have and/or to exhibit a plurality of distinct odors and/or to provide the plurality of distinct odors to the solvent mixture. Under these conditions, the addition of the odorant to the elemental sulfur solvent may cause the solvent mixture odor to include a variety, or a wide variety, of distinct odors, the combination of which may confuse and/or otherwise overwhelm olfactory organs of the individual who smells the solvent mixture, thereby causing the perceived intensity and/or the perceived offensiveness of the mixture odor to be less than the perceived intensity and/or the perceived offensiveness of the solvent odor. Such an effect may be referred to herein as a "white smell effect" and/or as a "white smell odor." Similar to white light and/or white noise, the white smell odor may be less distinctive, intense, and/or offensive to the user who smells the solvent mixture when compared to one or more of the individual odors that comprise the white smell odor, and especially the solvent odor.

The intensity of the mixture odor and/or the decrease in the intensity of the mixture odor relative to the solvent odor may be measured and/or quantified in any suitable manner. As an example, the presence of the odorant fraction may decrease a perceived intensity of the mixture odor, relative to the solvent odor, by at least 1, by at least 2, by at least 3, by at least 4, and/or by at least 5 on an Odor Intensity Referencing Scale. Examples of Odor Intensity Referencing Scales are defined by ASTM E544-99.

The offensiveness of the mixture odor and/or the decrease in the offensiveness of the mixture odor relative to the solvent odor may be measured and/or quantified in any suitable manner. As an example, the presence of the odorant fraction may decrease a perceived offensiveness of the mixture odor, relative to the solvent odor, by at least 1, by at least 2, by at least 3, by at least 4, and/or by at least 5 on an Odor Offensiveness Referencing Scale. Such Odor Offensiveness Referencing Scales generally are subjective in nature and typically utilize panelists to rank odors on a scale of 0 to 10, with 0 indicating that the odor is not offensive and 10 indicating that the odor is very offensive.

The elemental sulfur solvent fraction may have at least a threshold solvent sulfur solubility, which also may be referred to herein as a threshold solubility of elemental sulfur within the elemental sulfur solvent. Examples of the threshold solvent sulfur solubility include solubilities of 5 weight percent (wt %), 10 wt %, 15 wt %, 20 wt %, 30 wt %, 40 wt %, 50 wt %, 60 wt %, 70 wt %, 80 wt %, 90 wt %, 100 wt %, 110 wt %, 120 wt %, 130 wt %, 140 wt %, and/or 150 wt %. The threshold solvent sulfur solubility may be measured, established, and/or determined at standard temperature and pressure (STP).

The solvent mixture may include any suitable amount, fraction, and/or percentage of the elemental sulfur solvent. As examples, the elemental sulfur solvent fraction may form, define, comprise, be made of, and/or constitute at least 5 wt %, at least 10 wt %, at least 15 wt %, at least 20 wt %, at least 30 wt %, at least 40 wt %, at least 50 wt %, at least 60 wt %, and/or at least 70 wt % of the solvent mixture. Additionally or alternatively, the elemental sulfur solvent fraction may form, define, comprise, be made of, and/or constitute at most 95 wt %, at most 90 wt %, at most 85 wt %, at most 80 wt %, at most 70 wt %, at most 60 wt %, at most 50 wt %, at most 40 wt %, and/or at most 30 wt % of the solvent mixture.

It is within the scope of the present disclosure that the elemental sulfur solvent fraction may include and/or be a single-component elemental sulfur solvent fraction that includes, consists of, or consists essentially of a single elemental sulfur solvent. Alternatively, it is also within the scope of the present disclosure that the elemental sulfur solvent fraction may include and/or be a multi-component elemental sulfur solvent fraction that includes, consists of, or consists essentially of a plurality of elemental sulfur solvents, such as at least 2, at least 3, or at least 4 different elemental sulfur solvents.

The elemental sulfur solvent fraction may include any suitable elemental sulfur solvent and/or solvents. As examples, the elemental sulfur solvent fraction may include, consist of, or consist essentially of dimethyl disulfide (DMDS), methanol, isopropanol, diethanolamine (DEA), acetone, diaryl disulfide (DADS), carbon disulfide, toluene, and/or an organic elemental sulfur solvent fraction.

DMDS may be an effective elemental sulfur solvent; however, the solvent odor of DMDS may preclude practical utilization of pure, or at least substantially pure, DMDS as an elemental sulfur solvent. That said, the addition of the odorant fraction to a solvent mixture that includes DMDS may generate a mixture odor that permits the solvent mixture to be utilized as an elemental sulfur solvent. DMDS also may have other properties that may be improved by the addition of the odorant fraction to generate the solvent mixture. As an example, the solvent sulfur solubility of DMDS may be up to 115 wt %. However, when high concentrations of elemental sulfur are dissolved in DMDS, the resultant solvent-sulfur mixture may have a high viscosity and/or may clog filters. As discussed in more detail herein, the addition of the odorant fraction to the solvent mixture may decrease the viscosity of the solvent mixture and/or may decrease the solvent sulfur solubility of the solvent mixture that includes DMDS relative to pure DMDS, thereby decreasing the potential for complications with filtering and/or conveyance of the solvent-sulfur mixture.

As discussed, the solvent fraction may include a mixture of elemental sulfur solvents. One such mixture is marked under the trade name Brenntag 9597™ and includes 30-60 wt % DEA, 30-60 wt % methanol, 10-30 wt % acetone, and 5-10 wt % isopropanol.

It is within the scope of the present disclosure that the elemental sulfur solvent fraction and/or solvent mixtures that include the elemental sulfur solvent fraction may have, or may be selected to have, specified flammability properties. As an example, the elemental sulfur solvent fraction and/or the solvent mixtures that include the elemental sulfur solvent fraction may be inflammable, or at least substantially inflammable. As another example, the elemental sulfur solvent fraction and/or solvent mixtures that include the elemental sulfur solvent fraction may have at least a threshold lower flammability limit in air. Examples of the threshold lower flammability limit include thresholds of 10 volume percent (vol %), 20 vol %, 30 vol %, 40 vol %, 50 vol %, 60 vol %, 70 vol %, 80 vol %, and/or 90 vol %.

The elemental sulfur solvent fraction and/or solvent mixtures that include the elemental sulfur solvent fraction additionally or alternatively may have less than a threshold viscosity. Examples of the threshold viscosity include viscosities of 2 centipoise (cP), 4 cP, 6 cP, 8 cP, 10 cP, 15 cP, and/or 20 cP.

The solvent mixture may include any suitable amount, fraction and/or percentage of the odorant fraction. As examples, the solvent mixture may include at least 5 wt %, at least 10 wt %, at least 15 wt %, at least 20 wt %, at least 30 wt %, at least 40 wt %, at least 50 wt %, at least 60 wt %, and/or at least 70 wt % of the odorant fraction. Additionally or alternatively, the solvent mixture may include at most 95 wt %, at most 90 wt %, at most 85 wt %, at most 80 wt %, at most 70 wt %, at most 60 wt %, at most 50 wt %, at most 40 wt %, and/or at most 30 wt % of the odorant fraction.

It is within the scope of the present disclosure that the odorant fraction may include and/or be a single-component odorant fraction that includes, consists of, or consists essentially of a single odorant. Alternatively, it is also within the scope of the present disclosure that the odorant fraction may include and/or be a multi-component odorant fraction that includes, consists of, or consists essentially of a plurality of odorants, such as at least 2, at least 3, or at least 4 different odorants.

The odorant fraction may include any suitable odorant and/or odorants. As examples, the odorant fraction may include, consist of, or consist essentially of a ketone, acetone, methyl ethyl ketone (MEK), ethyl lactate, an amine, monoethanolamine (MEA), diethanolamine (DEA), triethanolamine (TEA), methyldiethanolamine (MDEA), an ester, an aromatic compound, and/or a sulfurous compound. Ketones, when utilized, may contribute a ketone, or a butterscotch, scent to the solvent mixture odor. Ethyl lactate, when utilized, may contribute a lemon scent to the solvent mixture odor.

It is within the scope of the present disclosure that the odorant fraction may be miscible, or at least substantially miscible, with the elemental sulfur solvent fraction. It is also within the scope of the present disclosure that the odorant fraction may be unreactive, or at least substantially unreactive, with and/or within the elemental sulfur solvent fraction. It is further within the scope of the present disclosure that the elemental sulfur solvent fraction may be non-toxic, or at least substantially non-toxic.

In a specific example, the elemental sulfur solvent fraction may include, consist of, or consist essentially of DMDS. In this example, as well as in any of the other examples of solvent mixtures that are disclosed herein, the elemental sulfur solvent fraction may include at least 20 wt % DMDS, at least 22 wt % DMDS, at least 24 wt % DMDS, at least 26 wt % DMDS, at least 28 wt % DMDS, and/or at least 30 wt % DMDS. Additionally or alternatively, the elemental sulfur solvent fraction may include at most 40 wt % DMDS, at most 38 wt % DMDS, at most 36 wt % DMDS, at most 34 wt % DMDS, at most 32 wt % DMDS, and/or at most 30 wt % DMDS.

In this example, as well as in any of the other examples of solvent mixtures that are disclosed herein, the odorant fraction may include, consist of, or consist essentially of acetone, MEK, and ethyl lactate. The odorant fraction may include at least 5 wt %, at least 6 wt %, at least 7 wt %, at least 8 wt %, at least 9 wt %, and/or at least 10 wt % acetone. Additionally or alternatively, the odorant fraction may include at most 15 wt %, at most 14 wt %, at most 13 wt %, at most 12 wt %, at most 11 wt %, and/or at most 10 wt % acetone. In addition to contributing the ketone, or butterscotch, odor to the mixture odor, the acetone may function as a wetting agent to improve sulfur uptake, or a rate of sulfur uptake, into the solvent mixture. The acetone additionally or alternatively may reduce the viscosity of the solvent mixture when compared to the viscosity of DMDS, especially after dissolution of elemental sulfur within the solvent mixture. The acetone additionally or alternatively may increase, or improve, a compatibility of the solvent mixture with ethylene propylene diene monomer (EPDM) rubber, which may be utilized in seals of a hydrocarbon conveyance system that utilizes the solvent mixture. Stated another way, the acetone may decrease a potential for damage to the EDPM rubber due to contact, of fluid contact, with the solvent mixture.

In this example, as well as in the other examples of solvent mixtures that are disclosed herein, the odorant fraction may include at least 10 wt %, at least 12 wt %, at least 14 wt %, at least 16 wt %, at least 18 wt %, and/or at least 20 wt % MEK. Additionally or alternatively, the odorant fraction may include at most 30 wt %, at most 28 wt %, at most 26 wt %, at most 24 wt %, at most 22 wt %, and/or at most 20 wt % MEK. Similar to acetone, the MEK may contribute the ketone, or butterscotch, odor to the mixture odor, may function as a wetting agent to improve sulfur uptake, or a rate of sulfur uptake, into the solvent mixture, may reduce the viscosity of the solvent mixture when compared to the viscosity of DMDS, especially after dissolution of elemental sulfur within the solvent mixture, and/or may increase, or improve, compatibility of the solvent mixture with EPDM rubber.

In this example, as well as in the other examples of solvent mixtures that are disclosed herein, the odorant fraction may include at least 20 wt %, at least 22 wt %, at least 24 wt %, at least 26 wt %, at least 28 wt %, and/or at least 30 wt % ethyl lactate. Additionally or alternatively, the odorant fraction may include at most 40 wt %, at most 38 wt %, at most 36 wt %, at most 34 wt %, at most 32 wt %, and/or at most 30 wt % ethyl lactate. The ethyl lactate may contribute a lemon odor to the mixture odor and/or may increase, or improve, compatibility of the solvent mixture with EPDM rubber.

In addition to the above, the odorant fraction in this example, as well as in the other examples of solvent mixtures that are disclosed herein, also may include, consist of, or consist essentially of an amine. The odorant fraction may include at least 3 wt %, at least 4 wt %, at least 5 wt %, at least 6 wt %, at least 7 wt %, at least 8 wt %, at least 9 wt %, at least 10 wt %, at least 11 wt %, and/or at least 12 wt % of the amine. Additionally or alternatively, the odorant fraction may include at most 22 wt %, at most 21 wt %, at most 20 wt %, at most 19 wt %, at most 18 wt %, at most 17 wt %, at most 16 wt %, at most 15 wt %, at most 14 wt %, at most 13 wt %, and/or at most 12 wt % of the amine. The DMDS may outgas hydrogen sulfide, and the amine may sequester the H2S within the solvent mixture. When the solvent mixture includes the amine, ketones, such as acetone and/or MEK, may be included in the solvent mixture to mask a smell of the amine.

In a more specific example, as well as in the other examples of solvent mixtures that are disclosed herein, the amine may include, consist of, or consist essentially of monoethanolamine (MEA) and diethanolamine (DEA). In this more specific example, the odorant fraction may include at least 0.1 wt %, at least 0.2 wt %, at least 0.3 wt % and/or at least 0.4 wt % MEA. Additionally or alternatively, the odorant fraction may include at most 0.1 wt %, at most 0.2 wt %, at most 0.3 wt %, and/or at most 0.4 wt % MEA. The MEA may increase a rate of sulfur uptake within the solvent mixture by serving as catalyst for the DMDS, may provide corrosion protection for metals, such as carbon steel, that contact the solvent mixture, and/or may improve, or increase, compatibility of the solvent mixture with EPDM rubber.

In this more specific example, as well as in the other examples of solvent mixtures that are disclosed herein, the odorant fraction also may include at least 0.1 wt %, at least 0.2 wt %, at least 0.3 wt %, at least 0.4 wt %, at least 0.5 wt % and/or at least 0.6 wt % DEA. Additionally or alternatively, the odorant fraction may include at most 0.6 wt %, at most 0.5 wt %, at most 0.4 wt %, at most 0.3 wt %, at most 0.2 wt % and/or at most 0.1 wt % DEA. The DEA may increase a selectivity of the solvent mixture to dissolve and/or retain elemental sulfur and/or hydrogen sulfide, may provide corrosion protection for metals, such as carbon steel, that contact the solvent mixture, may improve, or increase compatibility with EPDM rubber, and/or may decrease hydrogen sulfide generation and/or outgassing from the solvent mixture, especially at lower temperatures.

In another more specific example, as well as in the other examples of solvent mixtures that are disclosed herein, the amine may include, consist of, or consist essentially of triethanolamine (TEA). In this more specific example, as well as in the other examples of solvent mixtures that are disclosed herein, the odorant fraction may include at least 5 wt %, at least 6 wt %, at least 7 wt %, at least 8 wt %, at least 9 wt %, and/or at least 10 wt % TEA. Additionally or alternatively, the odorant fraction may include at most 5 wt %, at most 6 wt %, at most 7 wt %, at most 8 wt %, at most 9 wt %, and/or at most 10 wt % TEA.

In yet another more specific example, as well as in the other examples of solvent mixtures that are disclosed herein, the amine may include, consist of, or consist essentially of methyldiethanolamine (MDEA). In this more specific example, as well as in the other examples of solvent mixtures that are disclosed herein, the odorant fraction may include at least 5 wt %, at least 6 wt %, at least 7 wt %, at least 8 wt %, at least 9 wt %, and/or at least 10 wt % MDEA. Additionally or alternatively, the odorant fraction may include at most 5 wt %, at most 6 wt %, at most 7 wt %, at most 8 wt %, at most 9 wt %, and/or at most 10 wt % MDEA.

As discussed, the presence of the odorant fraction, within the solvent mixture, may decrease a mixture sulfur solubility of elemental sulfur within the solvent mixture when compared to the solvent sulfur solubility. Stated another way, the mixture sulfur solubility may be less than the solvent sulfur solubility. As also discussed, this decrease in sulfur solubility may be desirable, may decrease a viscosity of the solvent mixture when sulfur is dissolved in the solvent mixture, and/or may decrease a potential for clogging of filters by the solvent mixture when sulfur is dissolved within the solvent mixture.

It is within the scope of the present disclosure that the mixture sulfur solubility may be any suitable fraction, or percentage, of the solvent sulfur solubility. As examples, the mixture sulfur solubility may be at least 10%, at least 20%, at least 30%, at least 40%, at least 50%, at least 60%, at least 70%, and/or at least 80% of the solvent sulfur solubility. Additionally or alternatively, the mixture sulfur solubility may be at most 100%, at most 90%, at most 80%, at most 70%, at most 60%, at most 50%, at most 40%, and/or at most 30% of the solvent sulfur solubility.

It is also within the scope of the present disclosure that the odorant fraction may be selected such that the solvent mixture defines a target, or a desired, elemental sulfur solubility. Examples of the target elemental sulfur solubility include solubilities of at least 10 wt %, at least 20 wt %, at least 30 wt %, at least 40 wt %, at least 50 wt %, at least 60 wt %, at least 70 wt %, and/or at least 80 wt %. Additionally or alternatively, the target elemental sulfur solubility may be at most 100 wt %, at most 90 wt %, at most 80 wt %, at most 70 wt %, at most 60 wt %, at most 50 wt %, at most 40 wt %, and/or at most 30 wt %.

It is within the scope of the present disclosure that the elemental sulfur solvent fraction and/or the odorant fraction may be selected such that the solvent mixture is compatible with, does not degrade, and/or does not swell elastomeric seals, such as EPDM seals. Additionally or alternatively, the elemental sulfur solvent fraction and/or the odorant fraction may be selected such that the solvent mixture is not corrosive to metals, such as carbon steel. Additionally or alternatively, the elemental sulfur solvent fraction and/or the odorant fraction may be selected such that the solvent mixture is not flammable or has greater than a threshold lower flammability limit, examples of which are disclosed herein.

It is also within the scope of the present disclosure that the elemental sulfur solvent fraction and/or the odorant fraction may be selected such that the solvent mixture is compatible with water and/or dissolves elemental sulfur in the presence of water. Stated another way, the solvent mixture may be formulated to handle significant amounts of water, to dissolve elemental sulfur in the presence of, or while in fluid contact with, water, to be stable in the presence of, or while in fluid contact with, water, and/or to retain dissolved elemental sulfur in the presence of, or while in fluid contact with, water. This may include retaining the dissolved elemental sulfur while in the presence of, while in fluid contact with, and/or while mixed with water for at least a threshold water contact time. Examples of the threshold water contact time include at least 1 hour, at least 4 hours, at least 8 hours, at least 12 hours, at least 16 hours, at least 20 hours, at least 24 hours, at least 36 hours, and/or at least 48 hours.

FIG. 1 is a flowchart depicting methods 100, according to the present disclosure, of removing elemental sulfur from a hydrocarbon conveyance system. Methods 100 include providing a solvent mixture at 110. This may include providing any suitable solvent mixture, examples of which are disclosed herein. Methods 100 also include applying the solvent mixture at 120. This may include applying the solvent mixture to the elemental sulfur to dissolve the elemental sulfur within the solvent mixture. The applying at 120 may include applying in any suitable manner. As examples, the applying at 120 may include flushing the hydrocarbon conveyance system with the solvent mixture, wiping the hydrocarbon conveyance system with the solvent mixture, and/or spraying the hydrocarbon conveyance system with the solvent mixture. Examples of the hydrocarbon conveyance system include any suitable hydrocarbon well, hydrocarbon production facility, and/or hydrocarbon conveyance conduit.

It is within the scope of the present disclosure that the applying at 120 may include dissolving the elemental sulfur within the solvent mixture. Stated another way, the applying at 120 may include generating a loaded solvent mixture that includes both the solvent mixture and at least a portion of the elemental sulfur and/or that includes the solvent mixture with at least the portion of the elemental sulfur dissolved, suspended, and/or retained therein.

Under these conditions, methods 100 also may include improving a loaded solvent mixture odor of the loaded solvent mixture. This may include improving the loaded solvent mixture odor while maintaining a sulfur solubility of the loaded solvent mixture and/or while retaining the elemental sulfur dissolved, suspended, and/or retained within the loaded solvent mixture.

As an example, methods 100 may include adding ethyl lactate to the loaded solvent mixture to improve the loaded solvent mixture odor, to decrease an intensity of the loaded solvent mixture odor, and/or to decrease an offensiveness of the loaded solvent mixture odor. This may include adding the ethyl lactate to the loaded solvent mixture such that the ethyl lactate defines, or defines an additional, at least 1 wt %, at least 2 wt %, at least 3 wt %, at least 4 wt %, at least 5 wt %, at least 6 wt %, at most 10 wt %, at most 9 wt %, at most 8 wt %, at most 7 wt %, at most 6 wt %, at most 5 wt %, and/or 5 wt % of the loaded solvent mixture.

Figure 2:
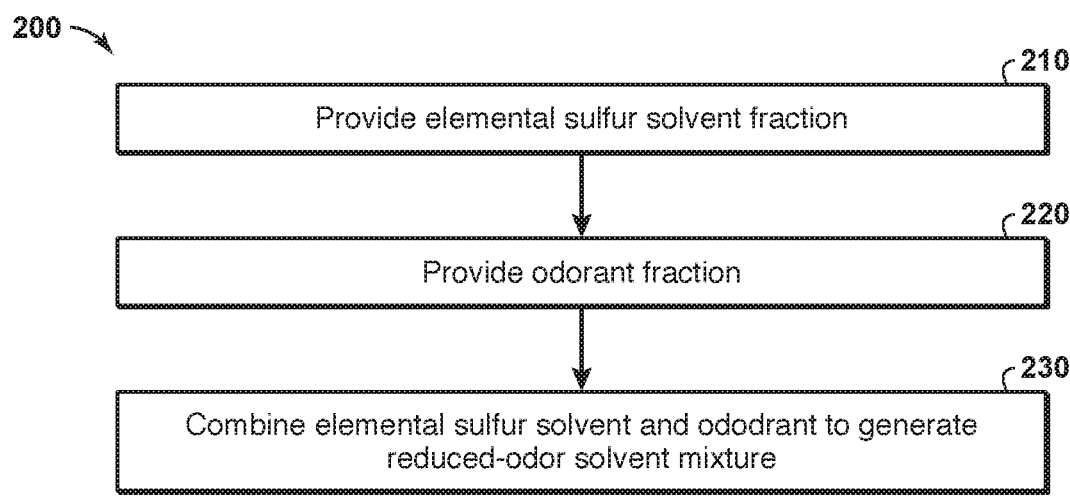
FIG. 2 is a flowchart depicting a method of forming a solvent mixture, according to the present disclosure.

FIG. 2 is a flowchart depicting methods 200 of forming a solvent mixture, according to the present disclosure. Methods 200 include providing an elemental sulfur solvent fraction at 210. This may include providing any suitable elemental sulfur solvent fraction in any suitable amount and/or as any suitable ratio, proportion, and/or percentage of the solvent mixture. Examples of the elemental sulfur solvent fraction are disclosed herein. Examples of portions, fractions, and/or percentages of the elemental sulfur solvent fraction in the solvent mixture also are disclosed herein.

Methods 200 also include providing an odorant fraction at 220. This may include providing any suitable odorant fraction in any suitable amount and/or as any suitable ratio, proportion, and/or percentage of the solvent mixture. Examples of the odorant fraction are disclosed herein.

Examples of portions, fractions, and/or percentages of the odorant fraction in the solvent mixture also are disclosed herein.

Methods 200 further include combining at 230 the elemental sulfur solvent fraction and the odorant fraction to generate the solvent mixture. The combining at 230 may be accomplished in any suitable manner. As an example, the elemental sulfur solvent fraction and the odorant fraction may be combined, stirred, and/or mixed within a mixing vessel.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order and/or concurrently.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" may mean A alone, B alone, C alone, A and B together, A and C together, B and C together, A, B, and C together, and optionally any of the above in combination with at least one other entity.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

INDUSTRIAL APPLICABILITY

The systems and methods disclosed herein are applicable to the elemental sulfur removal industry and/or to the oil and gas industries.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions, and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements, and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

What is claimed is:

1. A solvent mixture for dissolving elemental sulfur, the solvent mixture having a mixture odor and comprising:
    an elemental sulfur solvent fraction including an elemental sulfur solvent, wherein the elemental sulfur solvent has a solvent odor and has a solvent sulfur solubility of at least 10 weight percent (wt %) at standard temperature and pressure (STP); and
    an odorant fraction including at least one odorant, wherein the at least one odorant has an odorant odor that differs from the solvent odor;
    wherein the elemental sulfur solvent fraction includes dimethyl disulfide (DMDS) and forms at least 20 wt % and at most 80 wt % of the solvent mixture;
    wherein the odorant fraction includes at least 5 wt % and at most 15 wt % acetone, at least 10 wt % and at most 30 wt % methyl ethyl ketone (MEK), and at least 20 wt % and at most 40 wt % ethyl lactate; and
    wherein the presence of the odorant fraction, within the solvent mixture, does at least one of the following (i) and (ii):
    (i) decreases an intensity of the mixture odor relative to the solvent odor; and
    (ii) decreases an offensiveness of the mixture odor relative to the solvent odor.

2. The solvent mixture of claim 1, wherein the DMDS comprises at least 20 wt % and at most 40 wt % of the solvent mixture.

3. The solvent mixture of claim 1, wherein the odorant fraction includes:
    (i) at least 8 wt % and at most 12 wt % acetone;
    (ii) at least 18 wt % and at most 22 wt % methyl ethyl ketone (MEK); and
    (iii) at least 28 wt % and at most 32 wt % ethyl lactate.

4. The solvent mixture of claim 3, wherein the odorant fraction further includes at least 3 wt % and at most 22 wt % of an amine.

5. The solvent mixture of claim 4, wherein the amine includes:
    (i) at least 0.1 wt % and at most 0.4 wt % monoethanolamine (MEA); and
    (ii) at least 0.1 wt % and at most 0.6 wt % diethanolamine (DEA).

6. The solvent mixture of claim 4, wherein the amine includes triethanolamine (TEA).

7. The solvent mixture of claim 6, wherein the odorant fraction includes at least 5 wt % and at most 10 wt % TEA.

8. The solvent mixture of claim 4, wherein the amine includes methyldiethanolamine (MDEA).

9. The solvent mixture of claim 8, wherein the odorant fraction includes at least 5 wt % and at most 10 wt % MDEA.

10. The solvent mixture of claim 1, wherein the elemental sulfur solvent fraction includes at least 20 wt % and at most 40 wt % DMDS and further includes at least one of: (i) methanol; (ii) isopropanol; (iii) diethanolamine (DEA); (iv) acetone; (v) diaryl disulfide (DADS); (vi) carbon disulfide; (vii) toluene; and (viii) an organic elemental sulfur solvent fraction.

11. The solvent mixture of any of claim 1, wherein the odorant fraction further includes at least one of: (i) a ketone; (ii) acetone; (iii) an amine; (iv) monoethanolamine (MEA); (v) diethanolamine (DEA); (vi) triethanolamine (TEA); (vii) methyldiethanolamine (MDEA); (viii) an ester; (ix) an aromatic compound; and (x) a sulfurous compound.

12. The solvent mixture of claim 1, wherein a mixture sulfur solubility of elemental sulfur within the solvent mixture is at least 10% and at most 90% of the solvent sulfur solubility.

13. The solvent mixture of claim 1, wherein the odorant fraction is selected such that the solvent mixture defines a target elemental sulfur solubility of at most 100 wt %.

14. The solvent mixture of claim 1, wherein the presence of the odorant fraction both decreases the intensity of the mixture odor and decreases the offensiveness of the mixture odor.

15. The solvent mixture of claim 1, wherein the presence of the odorant fraction decreases a perceived intensity of the mixture odor, relative to the solvent odor, by at least 1 on an Odor Intensity Referencing Scale.

16. The solvent mixture of claim 1, wherein the presence of the odorant fraction decreases a perceived offensiveness of the mixture odor, relative to the solvent odor, by at least 1 on an Odor Offensiveness Referencing Scale.

17. A method of removing elemental sulfur from a hydrocarbon conveyance system, the method comprising:
    providing the solvent mixture of claim 1; and
    applying the solvent mixture to the elemental sulfur to dissolve the elemental sulfur within the solvent mixture.

18. A method of forming the solvent mixture of claim 1, the method comprising:
    providing the elemental sulfur solvent fraction;
    providing the odorant fraction; and
    combining the elemental sulfur solvent fraction and the odorant fraction to generate the solvent mixture.

19. The solvent mixture of claim 1, wherein the mixture odor differs from both the solvent odor and the odorant odor.

20. The solvent mixture of claim 1, wherein the elemental sulfur solvent fraction includes:
    (i) at least 30 wt % and at most 60 wt % diethanolamine (DEA);
    (ii) at least 30 wt % and at most 60 wt % methanol;
    (iii) at least 5 wt % and at most 30 wt % acetone;
    (iv) at least 5 wt % and at most 10 wt % isopropanol; and
    (v) at least 20 wt % and at most 25 wt % DMDS.

* * * * *